(12) United States Patent
Kim et al.

(10) Patent No.: US 11,602,990 B1
(45) Date of Patent: Mar. 14, 2023

(54) ELECTRONIC PEDAL APPARATUS

(71) Applicants: Hyundai Motor Company, Seoul (KR); Kia Corporation, Seoul (KR); Kyung Chang Industrial Co., Ltd., Daegu (KR)

(72) Inventors: Eun Sik Kim, Gwangmyeong-Si (KR); Hyeon Uk Kim, Daegu (KR); Ji Soo Kim, Daegu (KR); Jong Hwan Han, Daegu (KR)

(73) Assignees: Hyundai Motor Company, Seoul (KR); Kia Corporation, Seoul (KR); Kyung Chang Industrial Co., Ltd., Daegu (KR)

( * ) Notice: Subject to any disclaimer, the term of this patent is extended or adjusted under 35 U.S.C. 154(b) by 0 days.

(21) Appl. No.: 17/840,441

(22) Filed: Jun. 14, 2022

(30) Foreign Application Priority Data

Oct. 5, 2021 (KR) .......................... 10-2021-0131905

(51) Int. Cl.
| | |
|---|---|
| *G05G 1/30* | (2008.04) |
| *B60K 26/02* | (2006.01) |
| *B60T 7/06* | (2006.01) |
| *B60T 7/04* | (2006.01) |
| *B60K 26/04* | (2006.01) |

(52) U.S. Cl.
CPC .............. *B60K 26/02* (2013.01); *B60T 7/042* (2013.01); *B60T 7/06* (2013.01); *B60K 2026/026* (2013.01); *B60K 2026/046* (2013.01)

(58) Field of Classification Search
CPC .. G05G 1/30; G05G 1/32; G05G 1/36; G05G 1/38; G05G 1/40; G05G 1/405; G05G 1/44; G05G 1/445; G05G 1/46; B60K 26/02; B60K 2026/026; B60K 2026/024; B60K 2026/046; B60T 7/04; B60T 7/042; B60T 7/06; B60T 7/065; B60R 21/09
See application file for complete search history.

(56) References Cited

U.S. PATENT DOCUMENTS

| | | | | |
|---|---|---|---|---|
| 4,426,890 A * | 1/1984 | Hansen | ..................... | G05G 1/46 74/478 |
| 5,865,068 A * | 2/1999 | Huntley | ................... | G05G 1/30 74/513 |
| 6,058,796 A * | 5/2000 | Huntley | ................... | G05G 1/30 74/513 |
| 6,223,623 B1 * | 5/2001 | Vance | ..................... | G05G 1/30 74/513 |
| 10,906,514 B1 * | 2/2021 | Kim | ......................... | G05G 5/03 |

(Continued)

FOREIGN PATENT DOCUMENTS

| | | |
|---|---|---|
| DE | 102020204106 A1 * | 9/2021 |
| DE | 102020205375 A1 * | 10/2021 |
| KR | 10-2020-0070946 | 6/2020 |

OTHER PUBLICATIONS

Machine Translation of DE-102020204106-A1.*
Machine Translation of DE-102020205375-A1.*

*Primary Examiner* — Brian J McGovern
(74) *Attorney, Agent, or Firm* — Morgan, Lewis & Bockius LLP

(57) ABSTRACT

An electronic pedal apparatus is configured to perform an electronic pedal function by utilizing a basic configuration and also perform a foldable function by adding some elements to the basic configuration to be usefully used in an autonomous vehicle.

20 Claims, 19 Drawing Sheets

(56) References Cited

U.S. PATENT DOCUMENTS

| | | | | |
|---|---|---|---|---|
| 10,946,741 B1* | 3/2021 | Kim | .......................... | B60T 7/06 |
| 11,021,058 B1* | 6/2021 | Kim | .......................... | G05G 5/28 |
| 11,249,506 B1* | 2/2022 | Kim | .......................... | G05G 5/28 |
| 11,312,236 B1* | 4/2022 | Kim | .......................... | B60T 7/06 |
| 11,327,520 B1* | 5/2022 | Kim | .......................... | G05G 5/05 |
| 11,458,838 B1* | 10/2022 | Kim | ....................... | B60K 26/02 |
| 2016/0160965 A1* | 6/2016 | Kim | .......................... | G05G 1/30 |
| | | | | 74/512 |
| 2016/0187915 A1* | 6/2016 | Kim | .......................... | G05G 1/44 |
| | | | | 74/512 |
| 2019/0064869 A1* | 2/2019 | Hudlemeyer | ............ | G05G 5/08 |
| 2021/0331584 A1* | 10/2021 | Kim | .......................... | G05G 1/40 |
| 2022/0048384 A1* | 2/2022 | Kim | .......................... | G05G 5/28 |
| 2022/0055477 A1* | 2/2022 | Kim | .......................... | G05G 1/44 |
| 2022/0144222 A1* | 5/2022 | Kim | .......................... | G05G 5/28 |
| 2022/0314939 A1* | 10/2022 | Wagner | .................. | B60T 11/18 |
| 2022/0379852 A1* | 12/2022 | O'Neill | .................. | B60T 7/042 |

* cited by examiner

ELECTRONIC PEDAL APPARATUS

CROSS-REFERENCE TO RELATED APPLICATION(S)

The present application claims priority to Korean Patent Application No. 10-2021-0131905, filed on Oct. 5, 2021, the entire contents of which is incorporated herein for all purposes by this reference.

BACKGROUND OF THE PRESENT DISCLOSURE

Field of the Present Disclosure

The present disclosure relates to a technology regarding an electronic pedal apparatus used as an accelerator pedal and a brake pedal in a vehicle.

Description of Related Art

An autonomous vehicle refers to a smart vehicle employing an autonomous driving technology so that the vehicle automatically travels to the destination without the driver's manual operation of the steering wheel, acceleration pedal, brake, and the like.

If an autonomous driving situation is universally implemented, the driver may select an autonomous driving mode in which the vehicle automatically travels to the destination without the driver's manual operation.

In the autonomous driving mode, the driver may stretch legs and to rest comfortably, and the pedals (acceleration pedal, brake pedal) positioned in the lower space of the driver seat, if continuously exposed indoors, may interfere with the driver's rest or may cause unintended erroneous operation of the pedals, which may lead to an accident.

Therefore, there is a need to develop a technology regarding a pedal apparatus, wherein, in a manual driving mode in which the driver manually drives a car, a pedal pad protrudes toward the driver and remains exposed so that the driver can operate the same, and in an autonomous driving situation, exposure of the pedal pad is prevented so that the driver cannot operate the same, ensuring a comfortable rest of the driver, and preventing erroneous operation for safety reasons.

Furthermore, a smart vehicle capable of autonomous driving may use an electronic pedal apparatus having no mechanical connection structure (for example, cable) between a pedal and an acceleration system or between the pedal and a braking system.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an electronic pedal apparatus which may be used for an autonomous vehicle, wherein the basic configuration thereof may be used to perform an electronic pedal function, and some elements may be added to the basic configuration to perform a foldable function together.

In accordance with an aspect of the present disclosure, an electronic pedal apparatus may include: a pedal housing; a pedal arm rotatably coupled to the pedal housing via a hinge pin to be operated by a driver; a stroke detector fixed to the pedal housing and connected to the pedal arm to generate a signal related to a pedal function when the pedal arm rotates in response to the driver's operation; a link block provided to be forwardly spaced from the hinge pin and fixed to the pedal housing at a lower side of the pedal arm; a rotation link provided to be rotatably coupled to the link block and to be in contact with the pedal arm; and a spring module including first and second end portions rotatably coupled to the hinge pin and the rotation link, respectively, to provide the pedal arm with returning force thereof.

The electronic pedal apparatus may further include a pedal arm stopper fixed to the pedal housing at a position in front of the hinge pin and configured to restrain a full stroke position of the pedal arm by being in contact with the pedal arm during the rotation of the pedal arm.

The upper surface of the pedal arm stopper may be positioned above a center line connecting a center of the hinge pin and a rotation center of the rotation link in a straight line.

The pedal arm may include: an operation unit which is configured to be operated by the driver; and an arm unit which has a first end portion connected to the operation unit and a second end portion coupled to the hinge pin and is connected to the stroke detector.

The pedal arm may have an organ type structure in which a lower end portion of the arm unit is rotatably coupled to a lower side of a rear end portion of the pedal housing via the hinge pin and the operation unit on an upper side thereof rotates forwards and backwards around the hinge pin on a lower side thereof.

The rotation link may include: a pair of link units rotatably coupled to opposite side surfaces of the link block; and a link pin which connects the link units and comes into contact with the arm unit to support the pedal arm and to which the spring module is rotatably coupled.

Two arm units of the pedal arm may be arranged in parallel to be spaced from each other on a left side and a right side thereof; and the spring module may be configured to be positioned between two arm units.

The electronic pedal apparatus may be used an accelerator pedal apparatus or a brake pedal apparatus.

Furthermore, an electronic pedal apparatus according to the present disclosure may include: a pedal housing; a pedal arm rotatably coupled to the pedal housing via a hinge pin to be operated by a driver; a stroke detector fixed to the pedal housing and connected to the pedal arm to generate a signal related to a pedal function when the pedal arm rotates in response to the driver's operation; a link block provided to be forwardly spaced from the hinge pin, to be positioned under the pedal arm, and to be configured to slide with respect to the pedal housing; a rotation link provided to be rotatably coupled to the link block and to be in contact with the pedal arm; a spring module including first and second end portions rotatably coupled to the hinge pin and the rotation link, respectively, to provide the pedal arm with returning force thereof; and a foldable actuator fixed to the pedal housing and coming into contact with the link block and the rotation link during operation to operate for a pop-up state or a hidden state of the pedal arm.

The electronic pedal apparatus may further include: a return spring including first and second end portions supported by the pedal housing and the link block to provide returning force to the slid link block.

The electronic pedal apparatus may further include: a printed circuit board (PCB) fixed to the pedal housing and including a function of controlling operation of the foldable actuator.

The pedal arm may include: an operation unit which is configured to be operated by the driver; and an arm unit which has a first end portion connected to the operation unit and a second end portion coupled to the hinge pin and is connected to the stroke detector.

The rotation link may include: a pair of link units rotatably coupled to opposite side surfaces of the link block; and a link pin which connects the link units and comes into contact with the arm unit to support the pedal arm and to which the spring module is rotatably coupled.

A guide groove and a guide protrusion may be formed at the link block and the pedal housing, respectively, and sliding movement of the link block is guided by the guide groove and the guide protrusion.

A stopper protrusion for restricting the movement of the link block in a predetermined direction may be formed at a front end portion of the guide protrusion in a direction orthogonal to the guide protrusion.

The foldable actuator may include: a motor which is fixed to the pedal housing at a side of the link block and is operated by control of the PCB; a guide block which linearly moves along a lead screw rotating during operation of the motor to be in contact with or to be released from the link block, and when being in contact with the link block, restrains the movement of the link block; and a triangular guide which is connected to the guide block to move together with the guide block and is inserted under the rotation link to apply force for lifting the rotation link upwards when the guide block moves to come into contact with a front surface of the link block.

The triangular guide may be positioned below the rotation link when the guide block is in contact with the front surface of the link block to restrain the movement of the link block, and the full stroke position of the pedal arm may be restricted as the rotation link is in contact with the triangular guide when the pedal arm is rotated around the hinge pin in accordance with operation of the driver.

When the pedal arm is rotated around the hinge pin in accordance with operation of the driver in a state in which the guide block restrains the movement of the link block, the stroke detector may generate a signal related to the pedal function.

When the guide block releases the link block due to the movement of the guide block by operation of the motor in a state in which the guide block is in contact with the link block to restrain the movement of the link block, the link block may move in a direction opposite to the hinge pin due to an elastic force of the return spring, the rotation link may rotate toward the bottom portion of the pedal housing due to the elastic force of the spring module when the link block moves, the pedal arm may rotate around the hinge pin in a direction in which the pedal arm is inserted into the pedal housing due to its own weight when the rotation link rotates, and thus the pedal arm may be in the hidden state in which exposure thereof to the driver is blocked.

The link block may be moved in a direction toward the hinge pin when the guide block comes into contact with the link block due to the movement of the guide block by operation of the motor in a state in which the pedal arm is hidden, the triangular guide may be inserted under the rotation link and lifts the rotation link upwards when the guide block moves in a direction in which the guide block comes into contact with the link block, the pedal arm may rotate around the hinge pin in a direction protruding from the pedal housing in a state of being supported by the rotation link when the rotation link rotates upwards due to the triangular guide, and thus the pedal arm may be in the pop-up state in which operation by the driver is possible.

An electronic pedal apparatus according to the present disclosure is advantageous in that the basic configuration thereof may be used to perform an electronic pedal function, and some elements may be added to the basic configuration to perform a foldable function together so that the electronic pedal apparatus is useful for an autonomous vehicle.

Furthermore, the pedal apparatus according to the present disclosure is advantageous in that the same is configured in an organ type, improving the driver's operability and minimizing ankle fatigue; the same includes a high-load spring module so that the pedal effort, which is differently required by each vehicle type, may be tuned; costs may be saved accordingly; and package reduction and material cost saving may be accomplished by simplifying the configuration.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
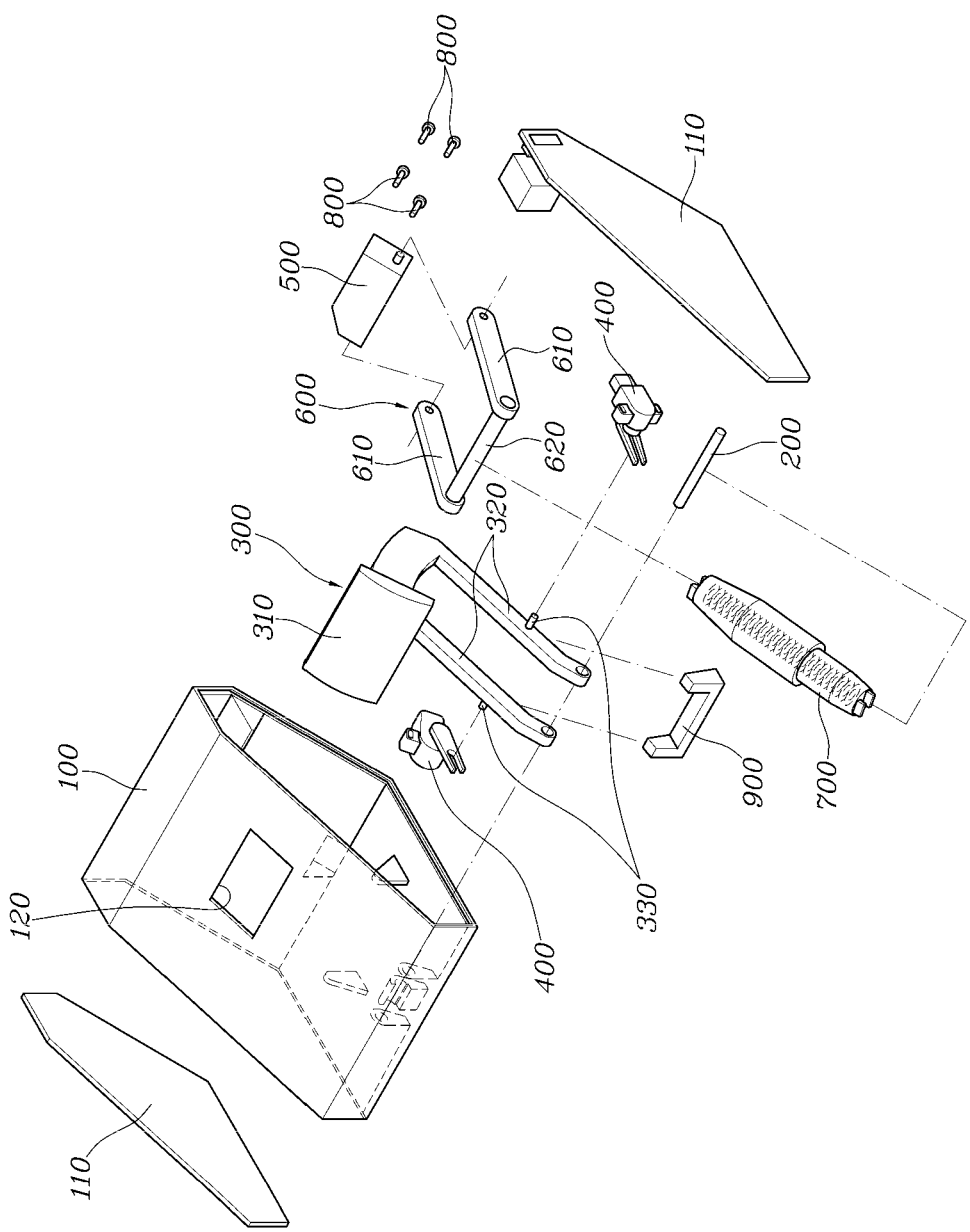
FIG. 1 is an exploded view of an electronic pedal apparatus according to the present disclosure.
Figure 2:
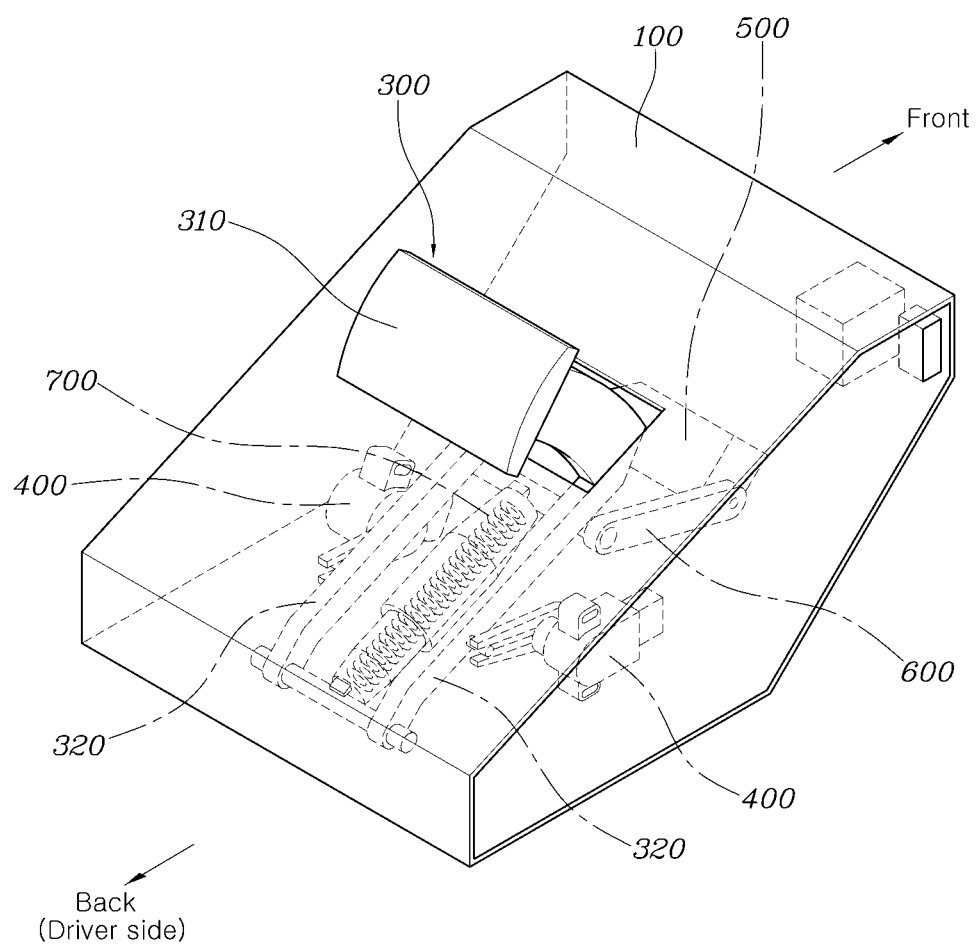
FIG. 2 is a view exemplarily illustrating the coupled state of FIG. 1.
Figure 3:
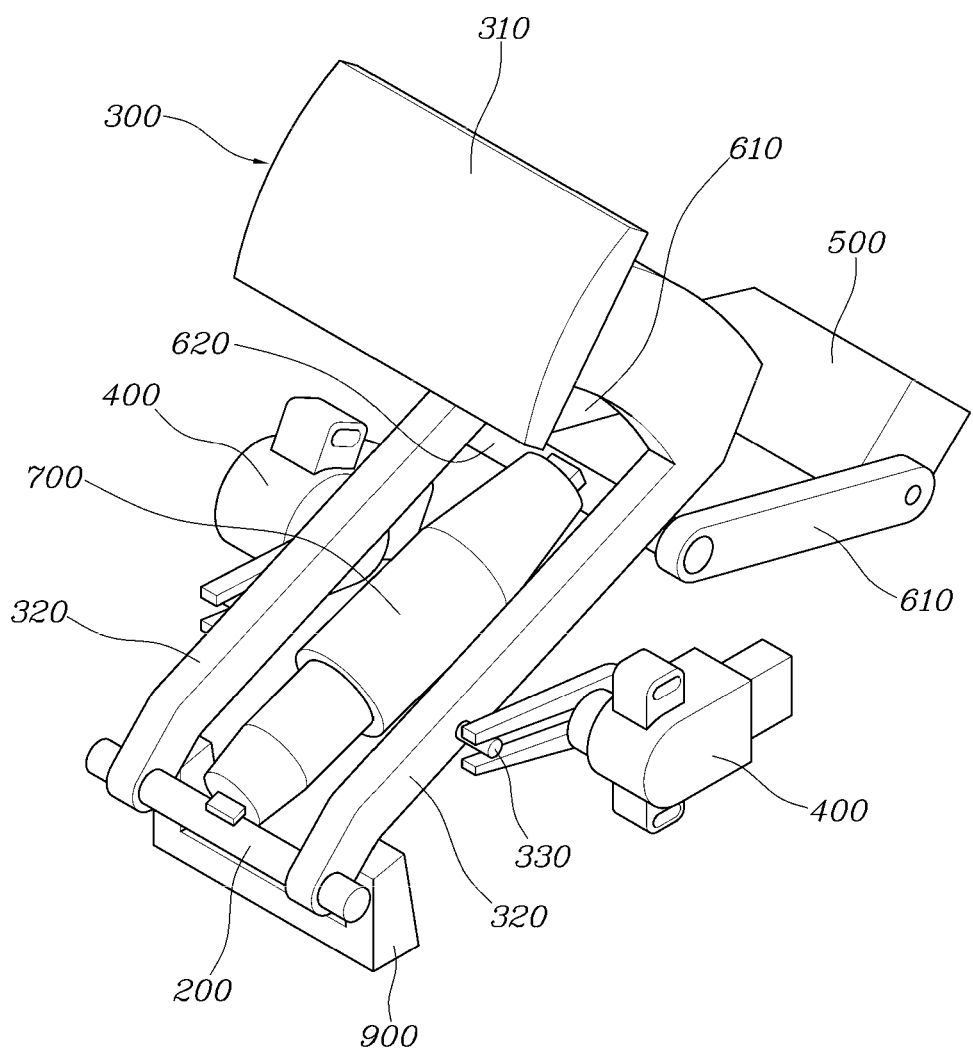
FIG. 3 is a view exemplarily illustrating a state in which a pedal housing is removed from FIG. 2.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

A specific structural or functional description of embodiments of the present disclosure included in the specification or application is provided merely for describing the exemplary embodiment according to an exemplary embodiment of the present disclosure. Therefore, the exemplary embodiments of the present disclosure may be implemented in various forms, and the present disclosure may not be construed as being limited to the exemplary embodiments described in the specification or application.

Various changes and modifications may be made to the exemplary embodiments according to an exemplary embodiment of the present disclosure, and therefore various exemplary embodiments will be illustrated in the drawings and described in the specification or application. However, it should be understood that embodiments according to the concept of the present disclosure are not limited to the disclosed exemplary embodiments of the present disclosure, but the present disclosure includes all modifications, equivalents, and alternatives falling within the spirit and scope of the present disclosure.

Such terms as "a first" and/or "a second" may be used to describe various elements, but the elements should not be limited by these terms. These terms are intended merely to distinguish one element from other elements. For example, a first element may be named a second element and similarly a second element may be named a second element without departing from the scope of protection of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to any other component, it should be understood that there is no component therebetween. The other expressions of describing a relation between structural elements, i.e., "between" and "merely between" or "neighboring" and "directly neighboring", should be interpreted similarly to the above description.

The terms used in the present disclosure are merely used to describe specific embodiments, and are not intended to limit the present disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

A control unit (controller) according to exemplary embodiments of the present disclosure may be implemented by a non-volatile memory which is configured to store data pertaining to an algorithm configured to control operations of various vehicle components or software instructions for reproducing the algorithm, and a processor which is configured to perform the operations as described below by use of the data stored in the corresponding memory. Here, the memory and the processor may be implemented as individual chips. Alternatively, the memory and the processor may be implemented as an integrated single chip. The processor may be in a form of one or more processors.

The present disclosure may be variously modified and include various exemplary embodiments in which specific exemplary embodiments will be described in detail hereinbelow. However, it shall be understood that the specific exemplary embodiments are not intended to limit the present disclosure thereto and cover all the modifications, equivalents, and substitutions which belong to the idea and technical scope of the present disclosure.

Hereinafter, an electronic pedal apparatus according to an exemplary embodiment of the present disclosure will be described with reference to the accompanying drawings.

As illustrated in FIG. 1 to FIG. 5, an electronic pedal apparatus according to the present disclosure includes: a pedal housing 100; a pedal arm 300 rotatably coupled to the pedal housing 100 via a hinge pin 200 and operated by a driver; a stroke detector 400 fixed to the pedal housing 100 and connected to the pedal arm 300 to generate a signal related to a pedal function when the pedal arm 300 rotates; a link block 500 provided to be forwardly spaced from the hinge pin 200 and fixed to the pedal housing 100 at a lower side of the pedal arm 300; a rotation link 600 provided to be rotatably coupled to the link block 500 and to be in contact with the pedal arm 300; and a spring module 700 including opposite end portions rotatably coupled to the hinge pin 200 and the rotation link 600, respectively, to provide the pedal arm 300 with the returning force.

The pedal housing 100 is formed in a hollow box shape, and in the internal space thereof, the pedal arm 300, the stroke detector 400, the link block 500, the rotation link 600, the spring module 700, a pedal arm stopper described later, and the like are provided, and a cover 110 is coupled to opposite sides thereof in a detachable manner.

The pedal arm 300 includes: an operation unit 310 which is operated with a foot of a driver; and an arm unit 320 which has one end portion connected to the operation unit 310 and the other end portion coupled to the hinge pin 200 and is connected to the stroke detector 400.

The operation unit 310 and the arm unit 320 are formed to be connected to each other in an L-shape when viewed from the side, and accordingly, an organ type pedal apparatus may be configured.

That is, the pedal arm 300 has an organ type structure in which a lower end portion of the arm unit 320 is rotatably coupled to a lower side of a rear end portion of the pedal housing 100 via the hinge pin 200 and the operation unit 310 on the upper side rotates forwards and backwards around the hinge pin 200 on a lower side, and the pad including an organ type structure has an advantage of improving the convenience, improving the operation feel, and minimizing the degree of ankle fatigue during the operation by the driver compared to the pendant type structure.

The operation unit 310 of the pedal arm 300 extends through a housing hole 120 formed in the pedal housing 100 and is inserted into the pedal housing 100 or protrudes from the pedal housing 100 according to the rotation of the pedal arm 300, and the arm unit 320 of the pedal arm 300 is always positioned in the pedal housing 100 regardless of the rotation of the pedal arm 300.

In the pedal arm 300, the lower end portion of the arm unit 320 is coupled to be rotatable about the hinge pin 200 forwards and backwards with respect to the pedal housing 100, and the operation unit 310 upwardly spaced from the hinge pin 200 is inserted into the pedal housing through the housing hole 120 formed at the pedal housing 100 when the arm unit 320 rotates forward, and protrudes from the pedal housing 100 to be exposed to the rear side on which the driver is positioned when the arm unit rotates backwards.

The operation unit 310 is provided to extend through the housing hole 120 formed at the pedal housing 100 to be inserted into the pedal housing 100 or protrude from the pedal housing 100 according to the rotation of the pedal arm 300, and the arm unit 320 is always positioned in the pedal housing 100 regardless of the rotation of the pedal arm 300 to be blocked from contact with the driver.

Therefore, when the driver operates the pedal arm 300 with his foot, the driver can operate only a surface of the operation unit 310 exposed from the pedal housing 100, the arm unit 320 positioned in the pedal housing 100 is blocked from contact with the foot of the driver and cannot be operated, and accordingly, the maloperation of the driver may be prevented.

The stroke detector 400 is coupled to a detector pin 330 provided at the pedal arm 300, and when the pedal arm 300 rotates with respect to the pedal housing 100, the stroke detector 400 is operated via the detector pin 330.

The detector pins 330 are positioned above the hinge pin 200 coupled to the arm unit 320 of the pedal arm 300 and are formed to protrude from the opposite side surfaces of the arm unit 320, respectively.

The detector pins 330 are formed to protrude from the arm unit 320 between the operation unit 310 and the hinge pin 200 toward the opposite sides.

As the detector pin 330 is provided at the arm unit 320 of the pedal arm 300, the position of the stroke detector 400 may be moved closer to the arm unit 320 side, and accordingly, the overall size can be reduced.

The stroke detector 400 performs detecting whether the pedal arm 300 returns to the initial position when the pedal arm 300 rotates, and a function of detecting the rotation of the pedal arm 300 when a driver steps on and operates the pedal arm 300.

The stroke detector 400 includes a permanent magnet and a printed circuit board (PCB) facing the permanent magnet, and thus detects the rotation angle of the pedal arm 300 via the change in the magnetic field strength according to the position change of the permanent magnet when the pedal arm 300 is rotated by the operation of the driver to generate a signal related to a pedal function.

The stroke detector 400 may be one of an accelerator position detector (APS) for generating a signal related to acceleration or a brake position detector (BPS) for generating a signal related to braking.

Therefore, the electronic pedal apparatus according to the present disclosure may be used as one of an accelerator pedal apparatus or a brake pedal apparatus, or may be used for both an accelerator pedal apparatus and a brake pedal apparatus.

The stroke detector 400 according to an exemplary embodiment of the present disclosure is a contact type detector connected to the pedal arm 300 via the detector pin 330 but may be configured as a non-contact type detector including only a permanent magnet and a printed circuit board (PCB) as necessary.

The link block 500 is provided to be forwardly spaced from the hinge pin 200 and fixed to the pedal housing 100 at a lower side of the pedal arm 300 via a coupling member 800 such as a plurality bolts or screws.

The rotation link 600 includes: a pair of link units 610 rotatably coupled to opposite side surfaces of the link block 500; and a link pin 620 which connects the link units 610 and comes into contact with the arm unit 320 to support the pedal arm 300 and to which the spring module 700 is rotatably coupled.

Two link units 610 are arranged in parallel to have the front end portions rotatably coupled to the opposite side surfaces of the link block 500, respectively, and the rear end portions of the link units 610 are connected by the link pin 620.

The link pin 620 is disposed to extend leftward/rightward to be provided to be in contact with the lower end portion of the arm unit 320 and thus supports the pedal arm 300 from the lower side thereof.

The spring module 700 is a high-load spring module and is provided to be positioned between two arm units 320 of the pedal arm 300, and accordingly, the external size of the pedal apparatus may be reduced.

The front end portion of the spring module 700 is rotatably coupled to the link pin 620 of the rotation link 600, the rear end portion of the spring module 700 is rotatably coupled to the hinge pin 200, and the spring module performs providing the pedal arm 300 with the returning force by elastic force.

A pedal apparatus of a vehicle is required to have a high load for safety during operation, and to the present end, in an exemplary embodiment according to the present disclosure, the high-load spring module 700 is used to implement the required pedal effort by use of the high-load spring module 700.

The high-load spring module 700 may normally include two or more dampers and two or more springs disposed in series to implement the pedal effort.

The electronic pedal apparatus according to the present disclosure further includes a pedal arm stopper 900 provided to be fixed to the pedal housing 100 at a position in front of the hinge pin 200.

The pedal arm stopper 900 is provided between the hinge pin 200 and the detector pin 330 to be fixed to the bottom surface of the pedal housing 100, and when the pedal arm 300 rotates, comes into contact with the pedal arm 300 to perform a function of restricting a full stroke position of the pedal arm 300.

Figure 4:
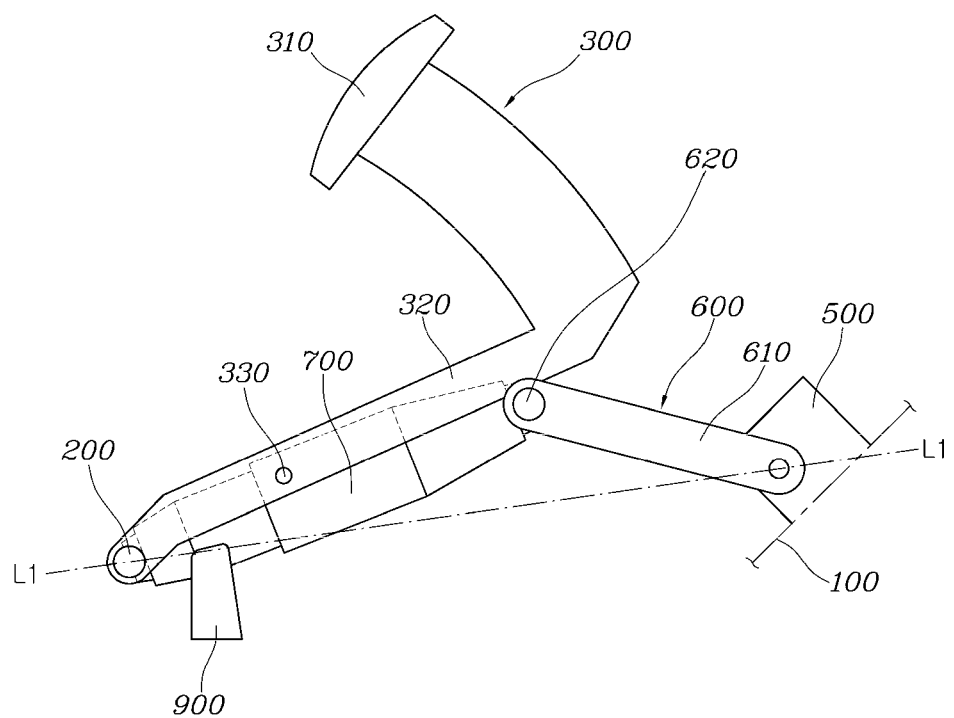
FIG. 4 is a view exemplarily illustrating when a driver does not operate a pedal arm.
Figure 5:
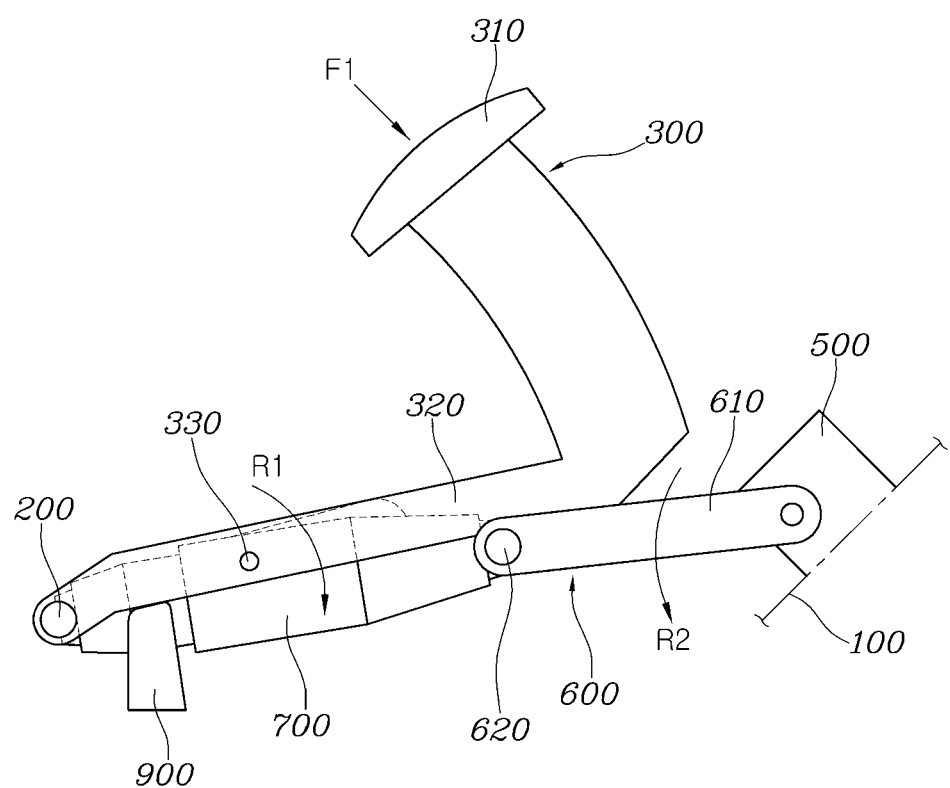
FIG. 5 is a view exemplarily illustrating when the driver steps on and operates the pedal arm in FIG. 4.
Figure 6:
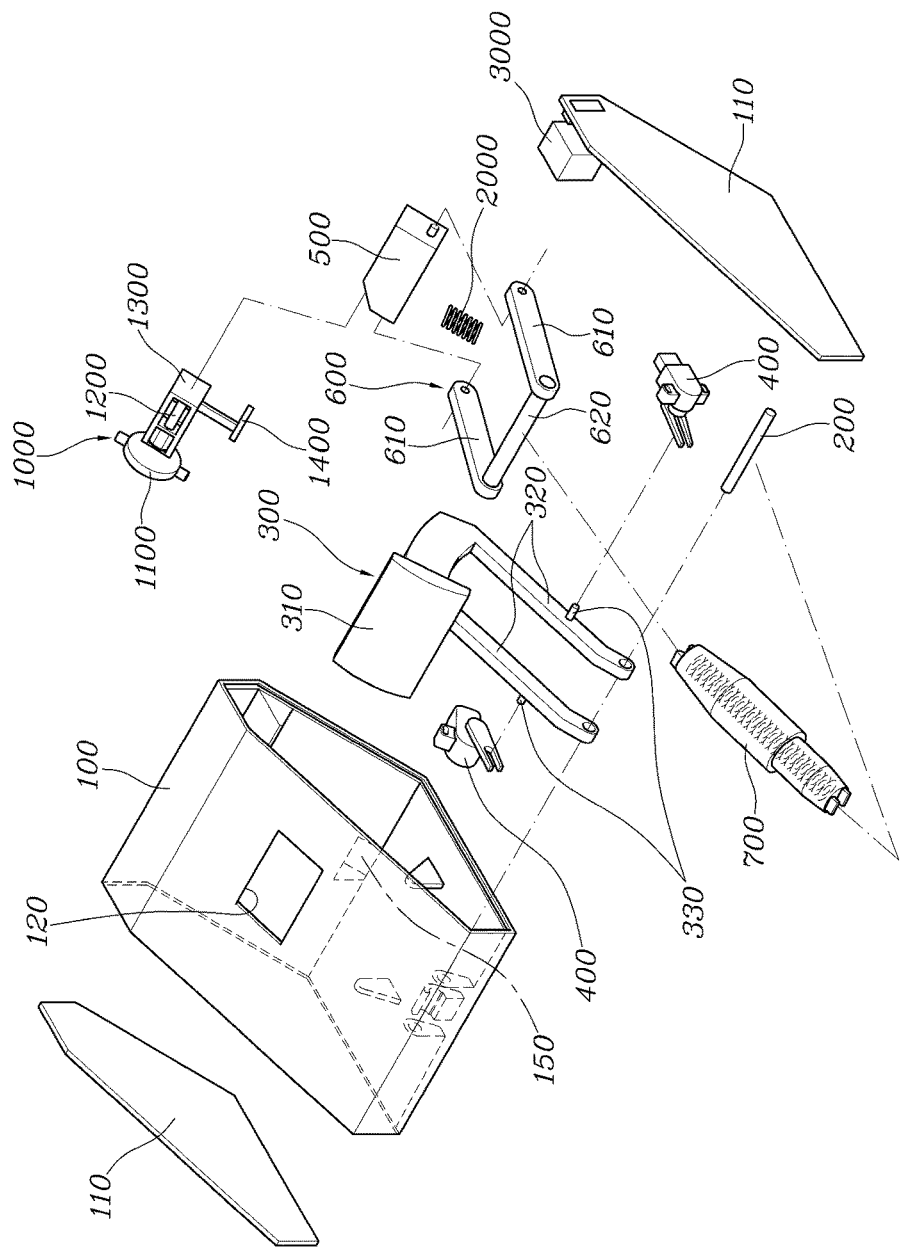
FIG. 6 is an exploded view of an electronic pedal apparatus to which a foldable function is added according to the present disclosure.
Figure 7:
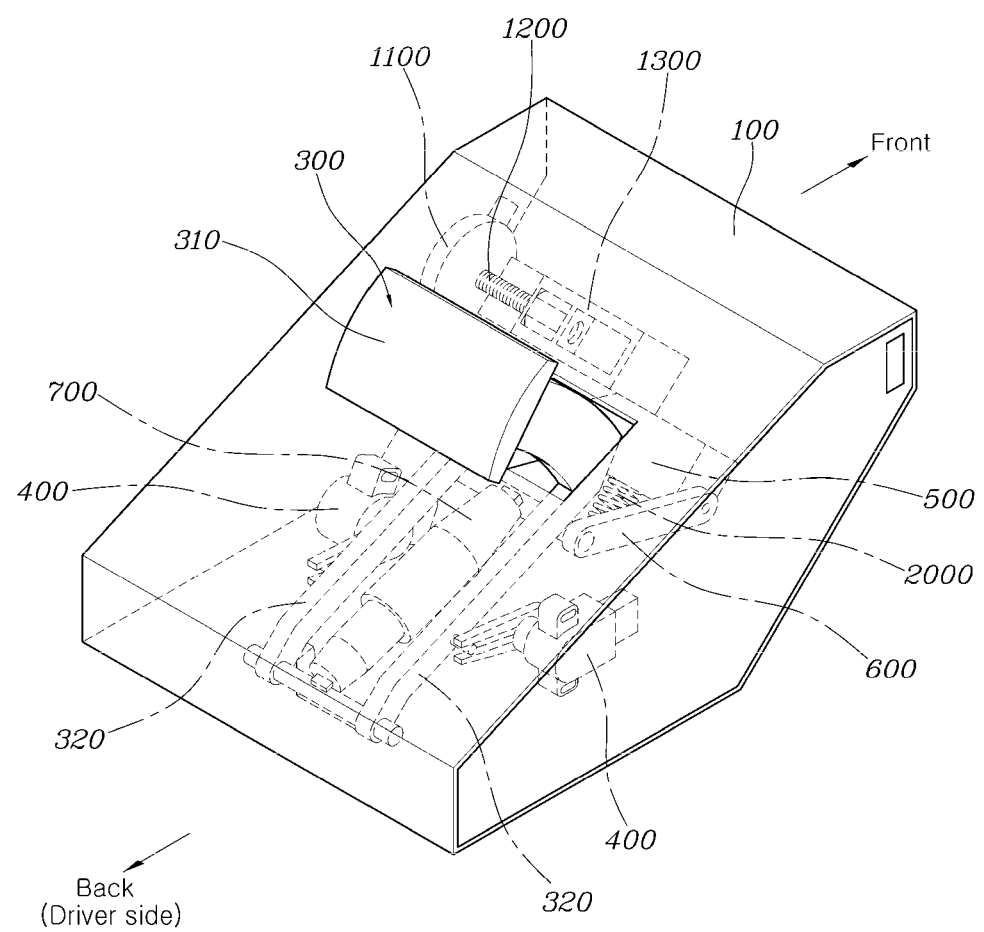
FIG. 7 and FIG. 8 are views exemplarily illustrating the coupled state of FIG. 6 and illustrate a state in which a pedal arm has popped-up.
Figure 8:
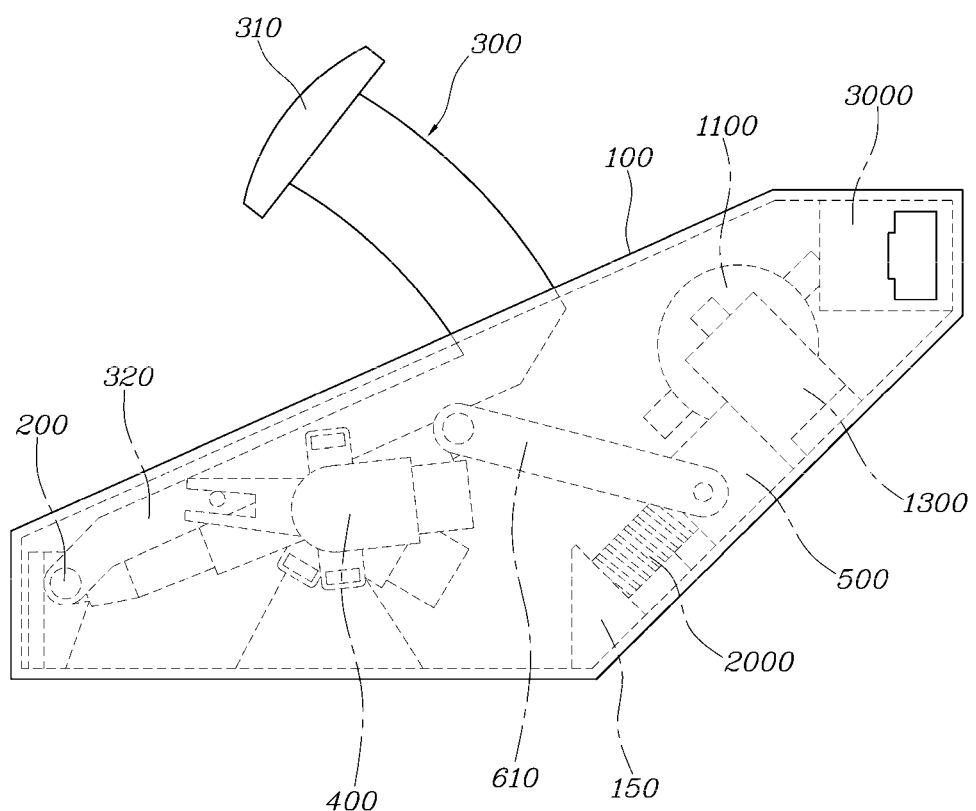
Figure 9:
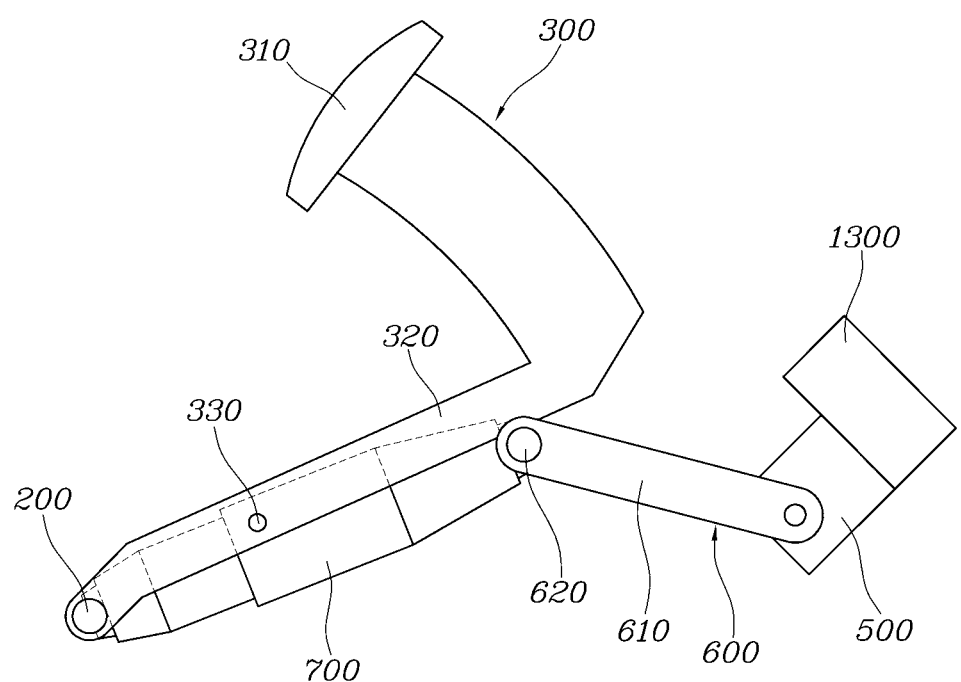
FIG. 9, FIG. 10, FIG. 11, FIG. 12 and FIG. 13 are views for illustrating when a pedal arm has popped-up.
Figure 10:
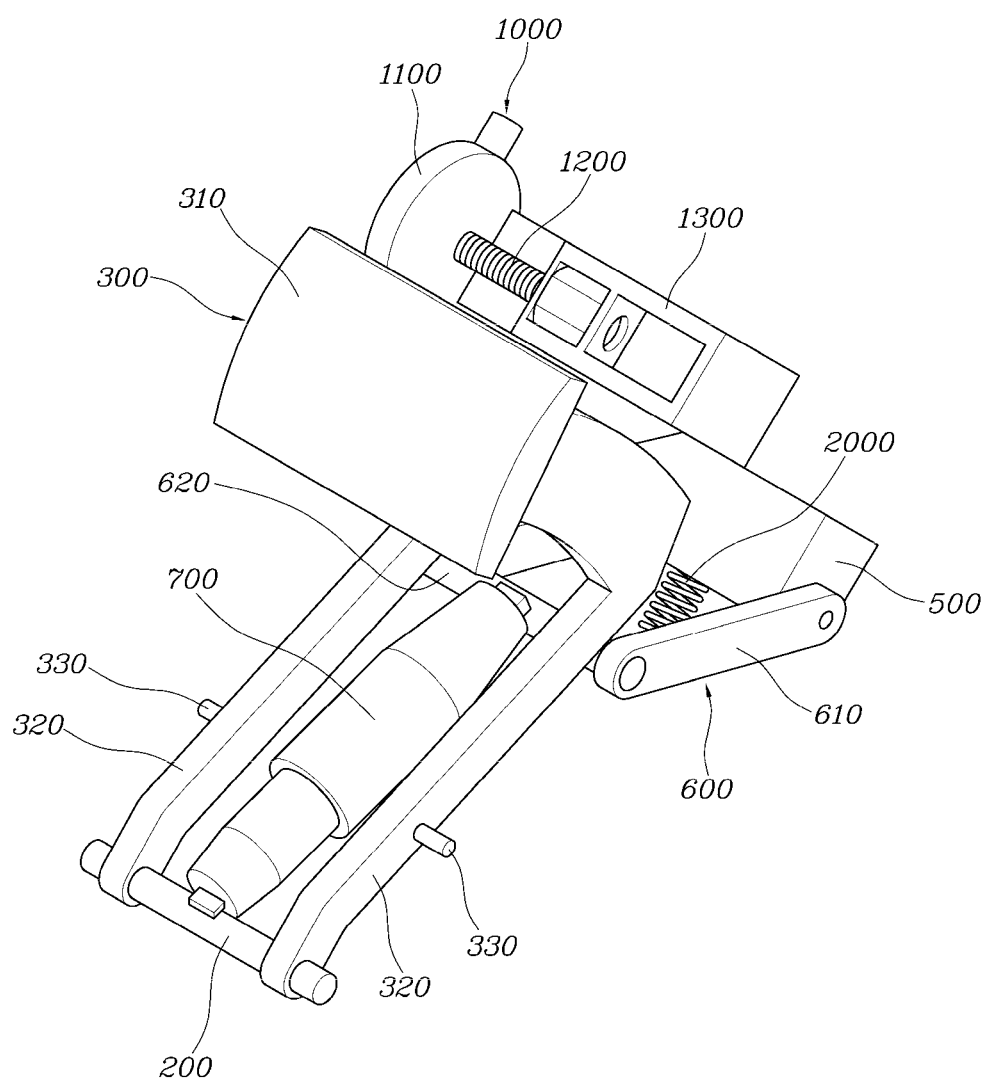
Figure 11:
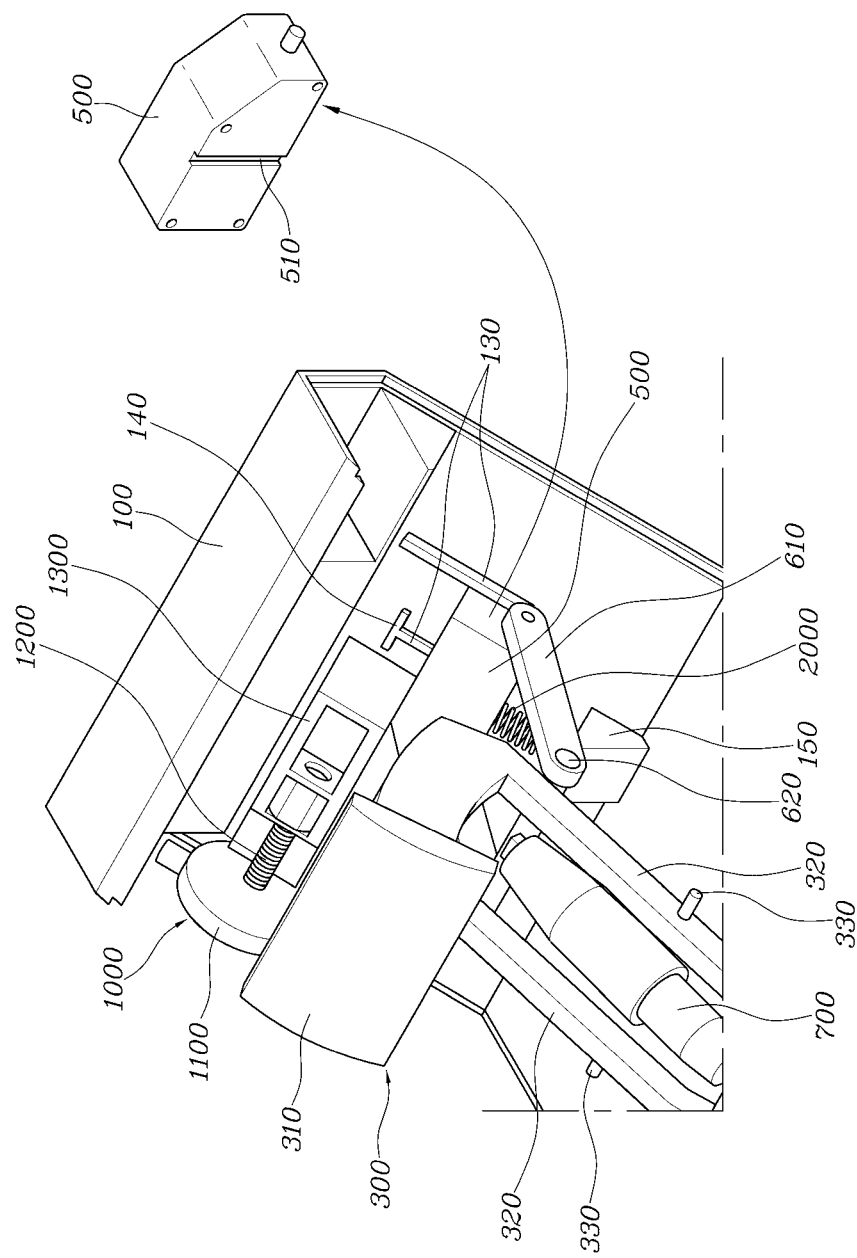
Figure 12:
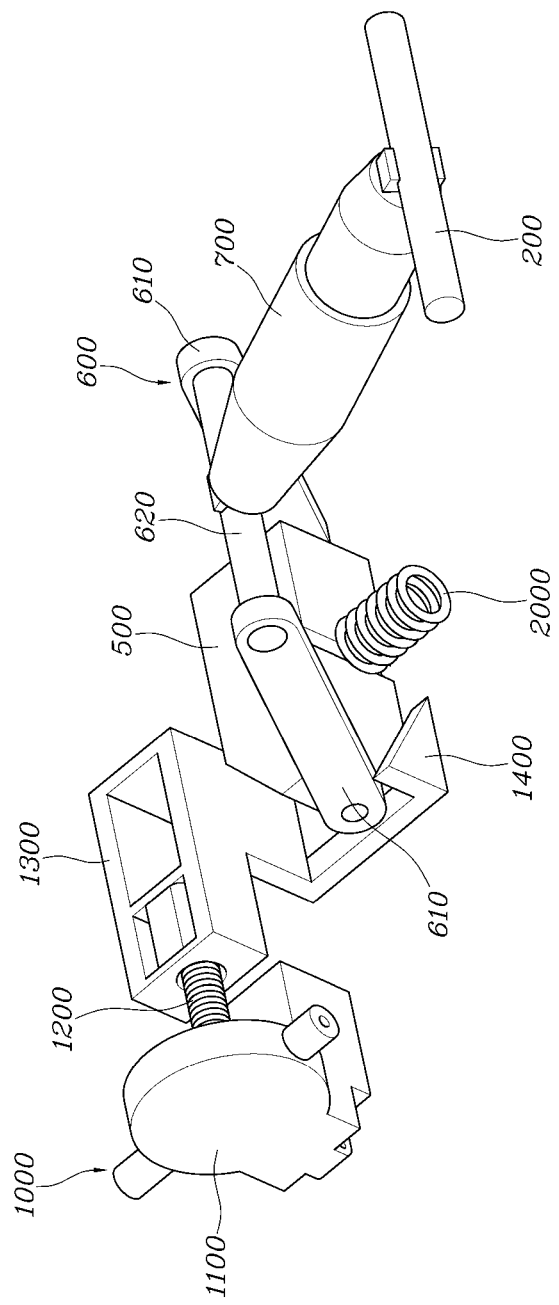
Figure 13:
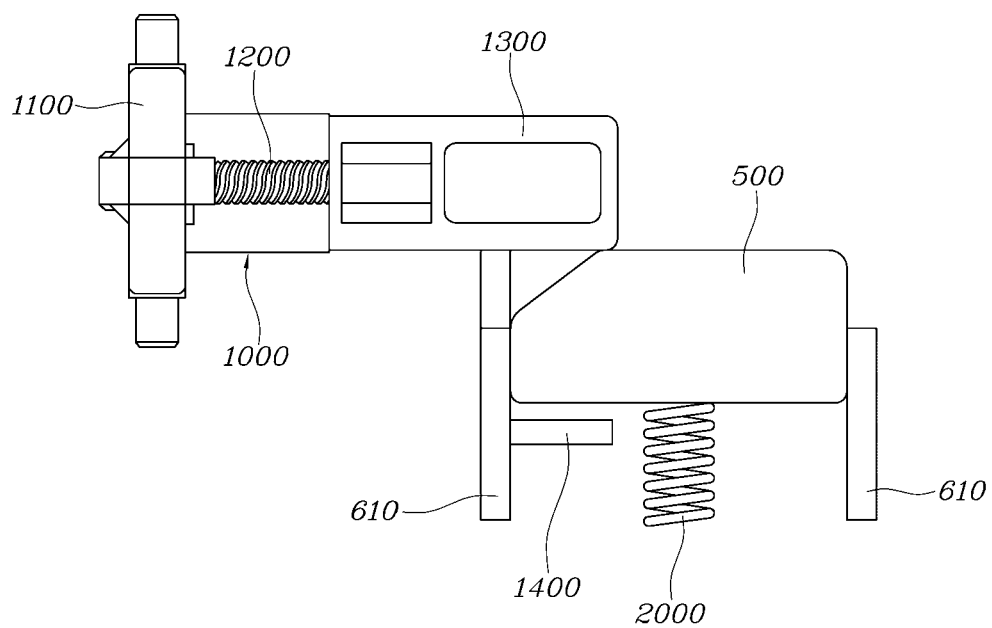

FIG. 4 illustrates a state in which a driver does not operate the pedal arm 300. FIG. 5 illustrates a state in which the driver steps on and operates the operation unit 310 of the pedal arm 300 in FIG. 4.

As in FIG. 5, when the driver steps on and operates the operation unit 310 of the pedal arm 300 (F1), the pedal arm 300 rotates around the hinge pin 200 (R1), and the rotation link 600 rotates around the point coupled with the link block 500 (R2). In the instant case, as the spring module 700 is compressed, the spring module 700 and the rotation link 600 extend in a straight line.

Because the link block 500 is fixed to the pedal housing 100 by the coupling member 800, when the pedal arm 300 is operated, the stable rotation of the rotation link 600 may be induced.

When the driver releases the operating force from the pedal arm 300, the pedal arm 300 and the rotation link 600 return to the initial state as in FIG. 4 by the spring force of the spring module 700.

Meanwhile, an upper surface of the pedal arm stopper 900 is positioned above a center line L1 connecting the center of the hinge pin 200 and the rotation center of the rotation link 600 in a straight line.

When the driver steps on and operates the pedal arm 300 (F1), the arm unit 320 of the pedal arm 300 comes into contact with the upper surface of the pedal arm stopper 900, and in the instant case, the position of the full stroke of the pedal arm 300 is restricted, and when the driver releases the operating force from the pedal arm 300, the pedal arm 300 returns to the initial state by the spring force of the spring module 700.

For the operated pedal arm 300 to smoothly return to the initial state by the spring force of the spring module 700, the upper surface of the pedal arm stopper 900, which is in contact with the arm unit 320 of the pedal arm 300, is positioned above the center line L1.

If the upper surface of the pedal arm stopper 900 comes into contact with the arm unit 320 of the pedal arm 300 under the center line L1, there may be a problem that the pedal arm 300 cannot smoothly return to the initial position even when the spring force of the spring module 700 acts on the pedal arm 300.

The electronic pedal apparatus according to the present disclosure may have both an electronic pedal function and a foldable function, and to the present end, may be configured so that the link block can slide and may further include a foldable actuator and a return spring for returning the link block.

That is, as illustrated in FIG. 6 to FIG. 20, an electronic pedal apparatus according to the present disclosure includes: a pedal housing 100; a pedal arm 300 rotatably coupled to the pedal housing 100 via a hinge pin 200 and operated by a driver; a stroke detector 400 fixed to the pedal housing 100 and connected to the pedal arm 300 to generate a signal related to a pedal function when the pedal arm 300 rotates; a link block 500 provided to be forwardly spaced from the hinge pin 200, to be positioned under the pedal arm 300, and to slide with respect to the pedal housing 100; a rotation link 600 provided to be rotatably coupled to the link block 500 and to be in contact with the pedal arm 300; a spring module 700 including opposite end portions rotatably coupled to the hinge pin 200 and the rotation link 600, respectively, to provide the pedal arm 300 with the returning force; and a foldable actuator 1000 fixed to the pedal housing 100 and coming into contact with the link block 500 and the rotation link 600 during the operation to operate for the pop-up state or hidden state of the pedal arm 300.

The pedal housing 100 has a hollow box shape, and in the internal space thereof, the pedal arm 300, the stroke detector 400, the link block 500, the rotation link 600, the spring module 700, the foldable actuator 1000, a return spring and a printed circuit board described later, and the like are provided, and a cover 110 is coupled to opposite sides thereof in a detachable manner.

The pedal arm 300 includes: an operation unit 310 which is operated with a foot of a driver; and an arm unit 320 which has one end portion connected to the operation unit 310 and the other end portion coupled to the hinge pin 200 and is connected to the stroke detector 400.

The operation unit 310 and the arm unit 320 are formed to be connected to each other in an L-shape when viewed from the side, and accordingly, an organ type pedal apparatus may be configured.

That is, the pedal arm 300 has an organ type structure in which a lower end portion of the arm unit 320 is rotatably coupled to a lower side of a rear end portion of the pedal housing 100 via the hinge pin 200 and the operation unit 310 on the upper side rotates forwards and backwards around the hinge pin 200, and the pad including an organ type structure has an advantage of improving the convenience, improving the operation feel, and minimizing the degree of ankle fatigue during the operation by the driver compared to the pendant type structure.

The operation unit 310 of the pedal arm 300 extends through a housing hole 120 formed in the pedal housing 100 and is inserted into the pedal housing 100 or protrudes from the pedal housing 100 according to the rotation of the pedal arm 300, and the arm unit 320 of the pedal arm 300 is always positioned in the pedal housing 100 regardless of the rotation of the pedal arm 300.

In the pedal arm 300, the lower end portion of the arm unit 320 is coupled to be rotatable about the hinge pin 200 forwards and backwards with respect to the pedal housing 100, and the operation unit 310 upwardly spaced from the hinge pin 200 is inserted into the pedal housing through the housing hole 120 formed at the pedal housing 100 when the arm unit 320 rotates forwards, and protrudes from the pedal housing 100 to be exposed to the rear side on which the driver is positioned when the arm unit rotates backwards.

The operation unit 310 is provided to extend through the housing hole 120 formed at the pedal housing 100 to be inserted into the pedal housing 100 or protrude from the pedal housing 100 according to the rotation of the pedal arm 300, and the arm unit 320 is always positioned in the pedal housing 100 regardless of the rotation of the pedal arm 300 to be blocked from contact with the driver.

Therefore, when the driver operates the pedal arm 300 with his foot, the driver can operate only a surface of the operation unit 310 exposed from the pedal housing 100, the arm unit 320 positioned in the pedal housing 100 is blocked from contact with the foot of the driver and cannot be operated, and accordingly, the maloperation of the driver may be prevented.

The stroke detector 400 is coupled to a detector pin 330 provided at the pedal arm 300, and when the pedal arm 300 rotates with respect to the pedal housing 100, the stroke detector 400 is operated via the detector pin 330.

The detector pins 330 are positioned above the hinge pin 200 coupled to the arm unit 320 of the pedal arm 300 and are formed to protrude from the opposite side surfaces of the arm unit 320, respectively.

The detector pins 330 are formed to protrude from the arm unit 320 between the operation unit 310 and the hinge pin 200 toward the opposite sides.

As the detector pin 330 is provided at the arm unit 320 of the pedal arm 300, the position of the stroke detector 400 may be moved closer to the arm unit 320 side, and accordingly, the overall size can be reduced.

The stroke detector 400 performs detecting whether the pedal arm 300 returns to the initial position when the pedal arm 300 rotates, and a function of detecting the rotation of the pedal arm 300 when a driver steps on and operates the pedal arm 300.

The stroke detector 400 includes a permanent magnet and a PCB facing the permanent magnet, and thus detects the rotation angle of the pedal arm 300 via the change in the magnetic field strength according to the position change of the permanent magnet when the pedal arm 300 is rotated by the operation of the driver to generate a signal related to a pedal function.

The stroke detector 400 may be one of an accelerator position detector (APS) for generating a signal related to acceleration or a brake position detector (BPS) form generating a signal related to braking.

Therefore, the electronic pedal apparatus according to the present disclosure may be used as one of an accelerator pedal apparatus or a brake pedal apparatus, or may be used for both an accelerator pedal apparatus and a brake pedal apparatus.

The stroke detector 400 according to an exemplary embodiment of the present disclosure is a contact type detector connected to the pedal arm 300 via the detector pin 330 but may be configured as a non-contact type detector including only a permanent magnet and a PCB as necessary.

The link block 500 is provided to be forwardly spaced from the hinge pin 200, to be positioned under the pedal arm 300, and to slide in front and rear inclined directions.

To the present end, a linear guide groove 510 is formed on a bottom surface of the link block 500, a guide protrusion 130 is formed at the pedal housing 100, and the link block 500 is provided in a structure which may be slidably moved along a direction inclined in a forward upward direction and a rear downward direction by the guide groove 510 and the guide protrusion 130.

In contrast, a structure in which a guide groove is formed at the pedal housing 100 and a guide protrusion is formed on a bottom surface of the link block 500 is also possible.

A stopper protrusion 140 for restricting the forward movement of the link block 500 is formed at the front end portion of the guide protrusion 130 formed at the pedal housing 100 in a direction orthogonal to the guide protrusion 130.

Furthermore, the backward movement of the link block 500 is restricted by a return spring 2000.

That is, the return spring 2000 is provided so that both end portions thereof are supported by the pedal housing 100 and the link block 500, and performs providing returning force for moving forward to the link block 500 which has slid backward thereof.

The return spring is provided so that the front end portion of the return spring 2000 is supported by the rear surface of the link block 500, and the rear end portion of the return spring 2000 is supported by a support protrusion 150 provided at the pedal housing 100.

The rotation link 600 includes: a pair of link units 610 rotatably coupled to opposite side surfaces of the link block 500; and a link pin 620 which connects the link units 610 and comes into contact with the arm unit 320 to support the pedal arm 300 and to which the spring module 700 is rotatably coupled.

Two link units 610 are disposed in parallel to have the front end portions rotatably coupled to the opposite side surfaces of the link block 500, respectively, and the rear end portions of the link units 610 are connected by the link pin 620.

The link pin 620 is disposed to extend leftward/rightward to be provided to be in contact with the lower end portion of the arm unit 320 and thus supports the pedal arm 300 from the lower side thereof.

The spring module 700 is a high-load spring module and is provided to be positioned between two arm units 320 of the pedal arm 300, and accordingly, the external size of the pedal apparatus may be reduced.

The front end portion of the spring module 700 is rotatably coupled to the link pin 620 of the rotation link 600, the rear end portion of the spring module 700 is rotatably coupled to the hinge pin 200, and the spring module performs providing the pedal arm 300 with the returning force by elastic force.

A pedal apparatus of a vehicle is required to have a high load for safety during operation, and to the present end, in an exemplary embodiment according to the present disclosure, the high-load spring module 700 is used to implement the required pedal effort by use of the high-load spring module 700.

The high-load spring module 700 may normally include two or more dampers and two or more springs disposed in series to implement the pedal effort.

An electronic pedal apparatus according to the present disclosure includes the foldable actuator 1000 which pops-up and hides the pedal arm 300 to perform a foldable function and further includes a PCB 3000 including a function of controlling the operation of the foldable actuator 1000.

The PCB 3000 may perform not only a function of controlling the operation of the foldable actuator 1000 but also a function of diagnosing a failure and CAN-communicating with a component related to a pedal.

The foldable actuator 1000 is provided to be positioned at the side portion of the link block 500, and the PCB 3000 is provided to be coupled to the cover 110 and positioned in the pedal housing 100.

When the pedal arm 300 is rotated by the operation of the foldable actuator 1000 and the operation unit 310 protrudes outside of the pedal housing 100 through the housing hole 120, the pedal arm 300 is in a pop-up state in which the operation by a driver is possible (see FIG. 7 to FIG. 13), and in contrast, when the operation unit 310 is inserted into the pedal housing 100 through the housing hole 120, the pedal arm 300 is in a hidden state in which the pedal arm is blocked from being exposed to the driver (see FIG. 15, FIG. 16, FIG. 17, FIG. 18, FIG. 19 and FIG. 20), therefore, the electronic pedal apparatus according to the present disclosure can implement a foldable function during the operation of the foldable actuator 1000.

The foldable actuator 1000 includes: a motor 1100 which is provided to be fixed to the pedal housing 100 at one side of the link block 500 and is operated by the control of the PCB 3000; a guide block 1300 which linearly moves along a lead screw 1200 rotating during the operation of the motor 1100 to be in contact with or to be released from the link block 500, and when being in contact with the link block 500, restrains the movement of the link block 500; and a triangular guide 1400 which is provided to be connected to the guide block 1300 to move together with the guide block 1300, and is inserted under the rotation link 600 to apply force for lifting the rotation link 600 upwards when the guide block 1300 moves to come into contact with the front surface of the link block 500.

The motor 1100 is a rotation motor, the lead screw 1200 rotates when the motor 1100 rotates, and the guide block 1300 coupled to the lead screw 1200 linearly moves along the lead screw 1200 when the lead screw 1200 rotates.

One side surface of the link block 500 is formed as an inclined surface and performs helping the guide block 1300 to move smoothly toward the front of the link block 500 when the guide block 1300 comes into contact.

The triangular guide 1400 is positioned below the rotation link 600 when the guide block 1300 is in contact with the front surface of the link block 500 to restrain the movement of the link block 500, and the full stroke position of the pedal arm 300 is restricted as the rotation link 600 is in contact with the triangular guide 1400 when the pedal arm 300 rotates around the hinge pin 200 by the operation of the driver.

Furthermore, when the pedal arm 300 rotates around the hinge pin 200 by the operation of the driver in a state in which the guide block 1300 restrains the movement of the link block 500, the stroke detector 400 generates a signal related to the pedal function to perform a normal electronic pedal function.

FIG. 7 to FIG. 13 illustrate a pop-up state in which the operation unit 310 of the pedal arm 300 protrudes outside of the pedal housing 100 through the housing hole 120, and in the pop-up state, a driver can step on the pedal arm 300 to operate the pedal arm directly and manually.

Figure 14:
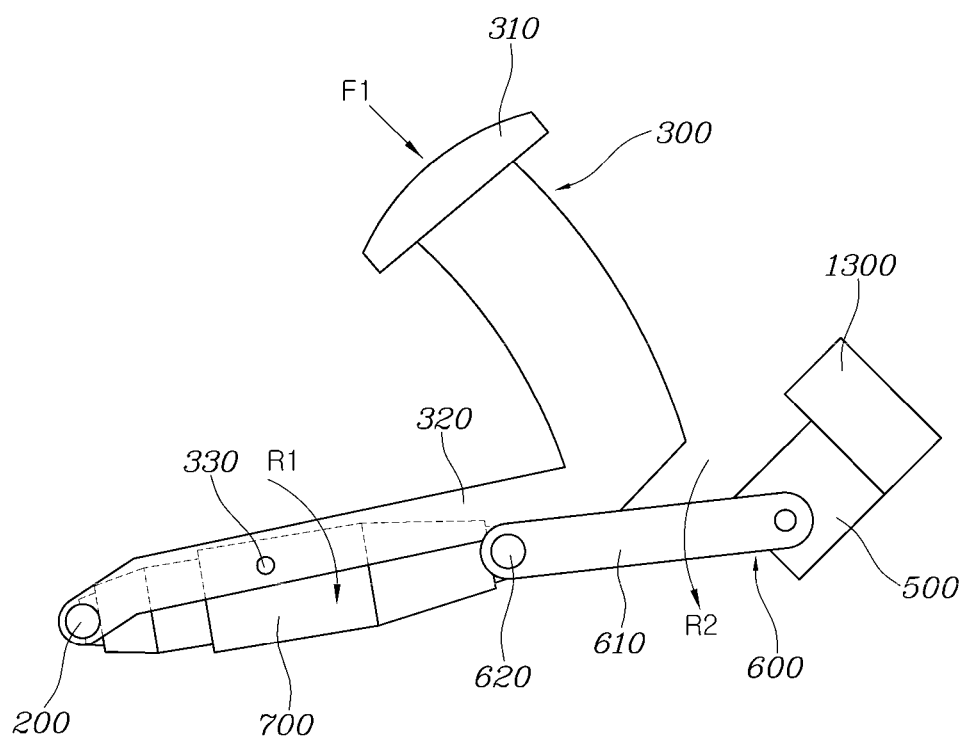
FIG. 14 is a view exemplarily illustrating a state in which a driver operates normally the popped-up pedal arm.
Figure 15:
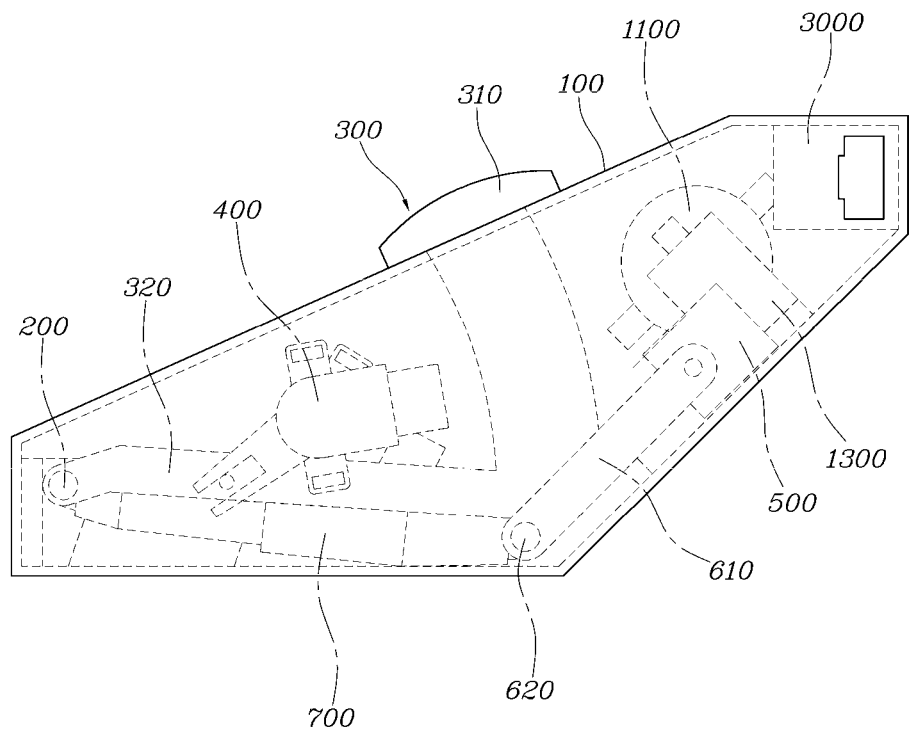
FIG. 15, FIG. 16, FIG. 17, FIG. 18, FIG. 19 and FIG. 20 are views for illustrating when a pedal arm is in a hidden state.
Figure 16:
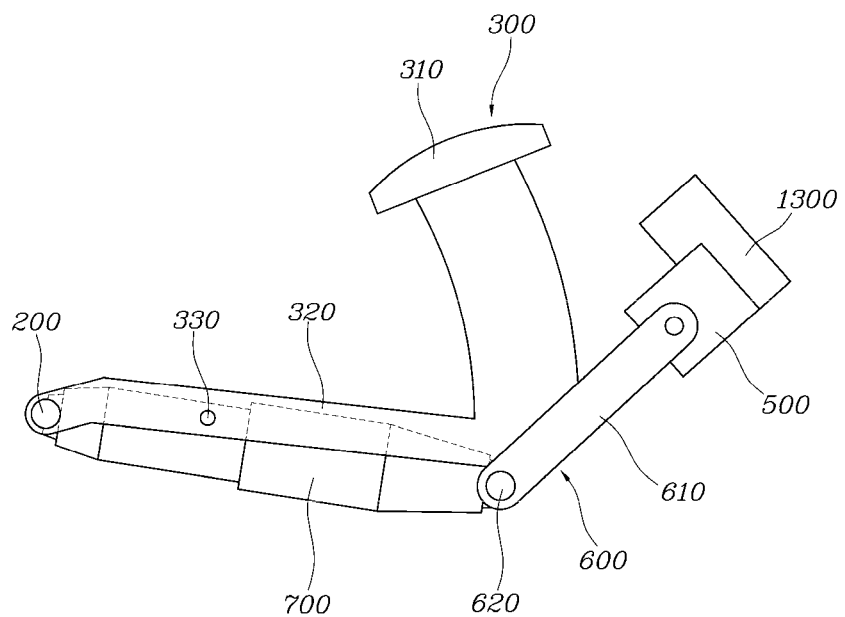
Figure 17:
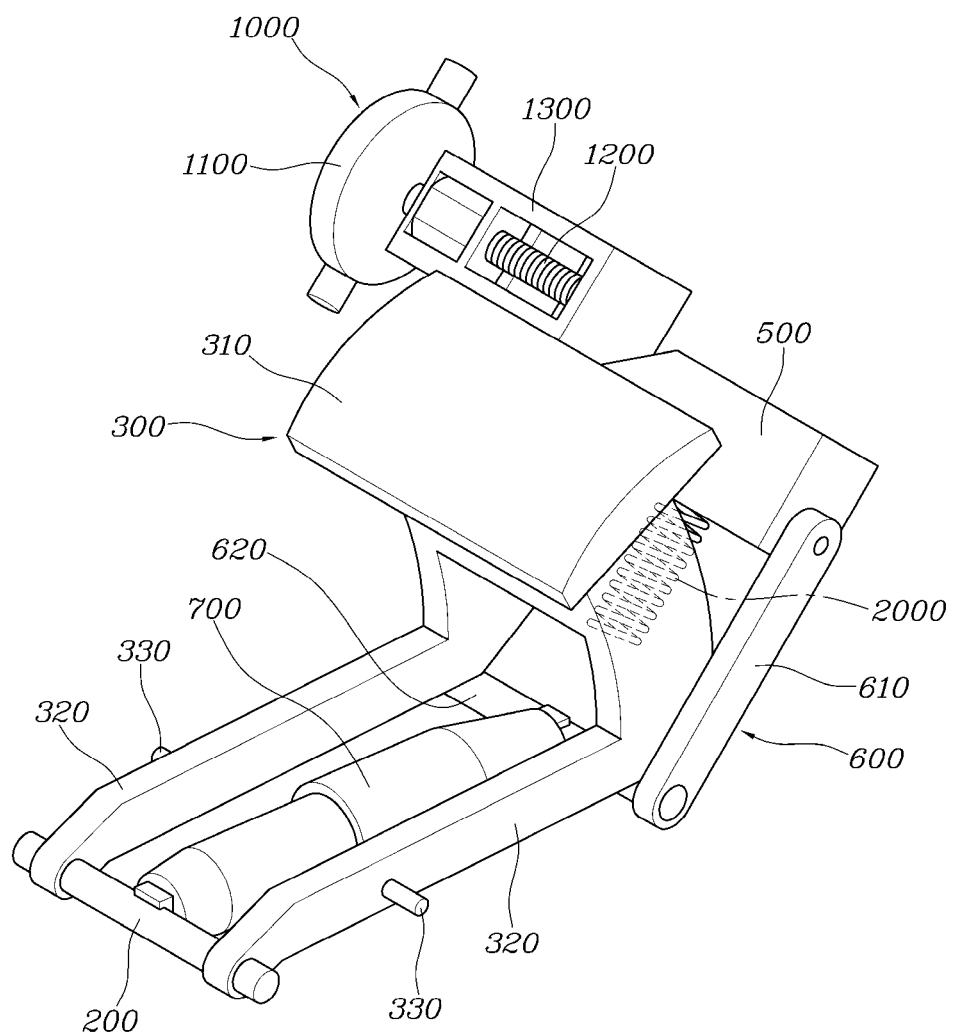
Figure 18:
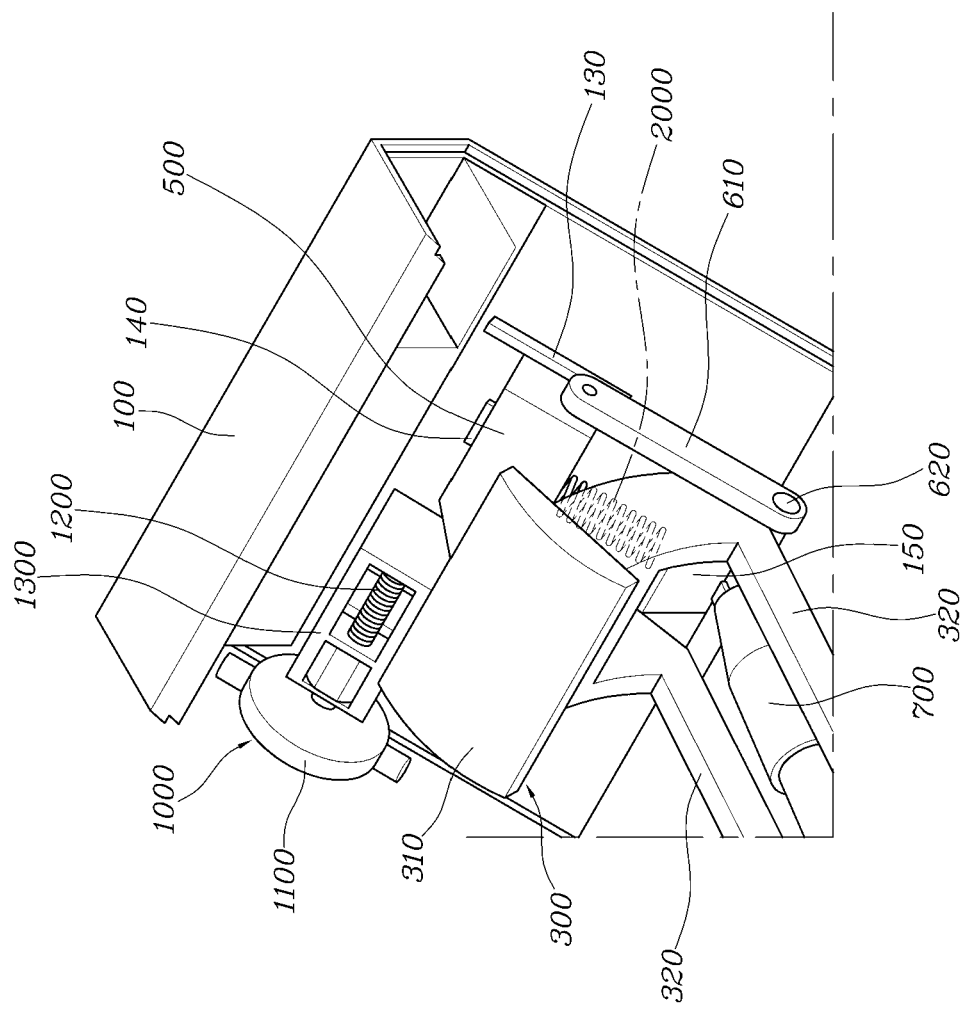
Figure 19:
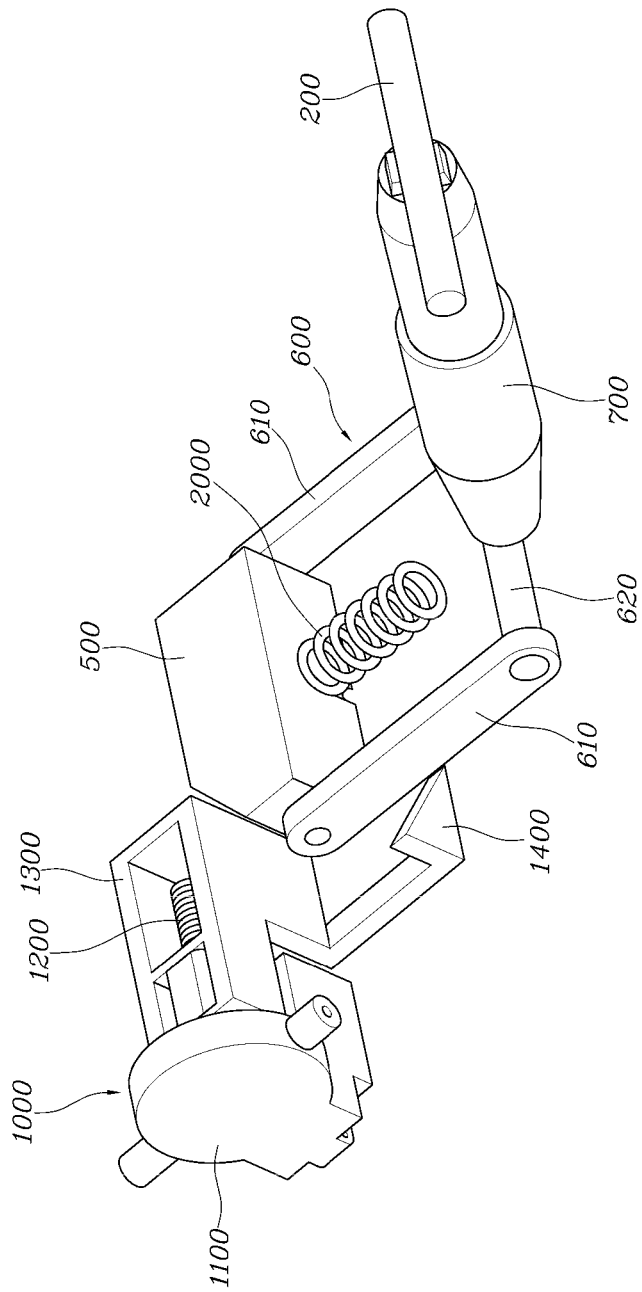
Figure 20:
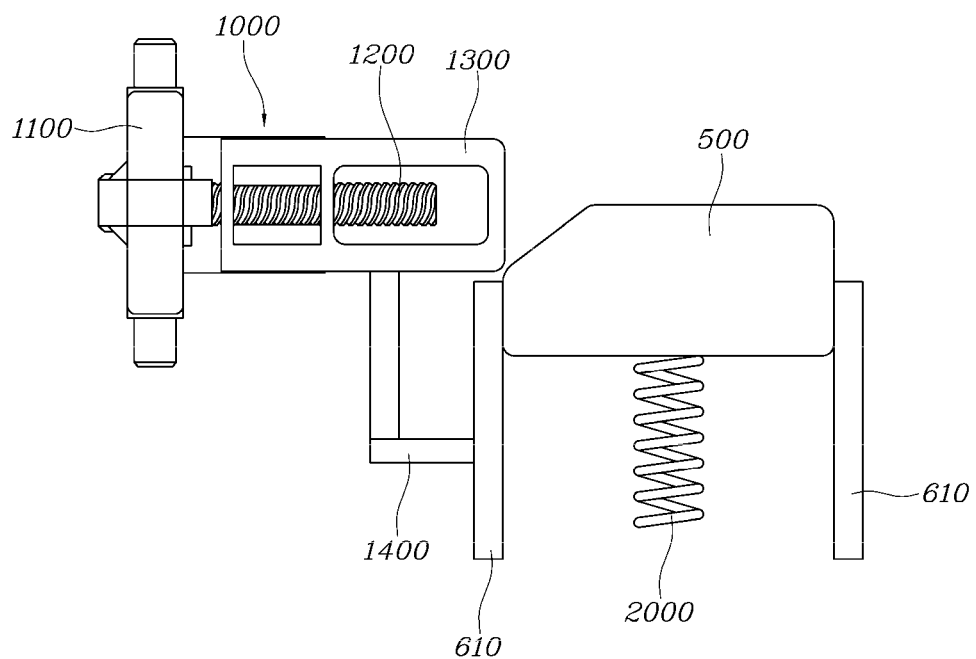

FIG. 14 illustrates the state when a driver steps on and operates the operation unit 310 of the pedal arm 300 in a state in which the pedal arm 300 is popped-up.

When the driver steps on and operates the popped-up the operation unit 310 of the pedal arm 300 (F1), the pedal arm 300 rotates around the hinge pin 200 (R1), and the rotation link 600 rotates around the point coupled with the link block 500 (R2). In the instant case, as the spring module 700 is compressed, the spring module 700 and the rotation link 600 extend in a straight line.

Because the front surface of the link block 500 has been supported by the guide block 1300 to be fixed, the stable rotation of the rotation link 600 may be induced during the operation of the pedal arm 300.

FIG. 15, FIG. 16, FIG. 17, FIG. 18, FIG. 19 and FIG. 20 illustrate the hidden state in which the pedal arm 300 rotates around the hinge pin 200 due to the operation of the foldable actuator 1000 so that the operation unit 310 is inserted into the pedal housing 100 through the housing hole 120.

As in FIG. 7 to FIG. 13, when the guide block 1300 releases the link block 500 due to the movement of the guide block 1300 by the operation of the motor 1100 in a state in which the pedal arm 300 is popped-up, the link block 500 moves in a forward direction opposite to the hinge pin 200 by the spring force of the return spring 200, the rotation link 600 rotates toward the bottom portion of the pedal housing 100 due to the spring force of the spring module 700 when the link block 500 moves forwards, the pedal arm 300 rotates around the hinge pin 200 in a direction in which the pedal arm 300 is inserted into the pedal housing 100 due to its own weight when the rotation link 600 rotates, and thus the pedal arm 300 is in the hidden state in which exposure thereof to the driver is blocked.

When a return spring is applied to the hinge pin 200, it is possible to carry out the hiding operation of the pedal arm 300 more easily due to the spring force of the return spring.

When the pedal arm 300 is in the hidden state, the pedal arm 300 has been blocked from being exposed to the driver and thus the operation by the driver is impossible.

The hidden state is implemented in an autonomous driving mode of a vehicle, and when the pedal is hidden, a driver can take a comfortable rest in a relax mode as a space under the driver's seat becomes a large space without pedal interference. Furthermore, safety may be improved by blocking maloperation of the pedal in the autonomous driving situation.

Furthermore, when the guide block 1300 comes into contact with the link block 500 due to the movement of the guide block 1300 by the operation of the motor 1100 in a state in which the pedal arm 300 is hidden, the link block 500 is moved to the rear side in which the hinge pin 200 is positioned. When the guide block 1300 moves in a direction in which the guide block comes into contact with the link block 500, the triangular guide 1400 is inserted under the rotation link 600 and lifts the rotation link 600 upwards. When the rotation link 600 rotates upwards due to the triangular guide 1400, the arm unit 320 of the pedal arm 300 rotates around the hinge pin 200 in a direction protruding from the pedal housing 100 in a state of being supported by the rotation link 600. Therefore, as in FIG. 7 to FIG. 13, the pedal arm 300 is changed to the pop-up state in which the operation by the driver is possible.

In a state in which the pedal arm 300 is popped-up, the guide block 1300 is positioned in front of the link block 500 and is in contact with the link block 500 so that the movement of the link block 500 is restrained by the guide block 1300.

As described above, an electronic pedal apparatus according to the present disclosure performs an electronic pedal function by utilizing a basic configuration and performs a foldable function by adding some elements to the basic configuration and may be usefully used in an autonomous vehicle.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An electronic pedal apparatus comprising:
a pedal housing;
a pedal arm rotatably coupled to the pedal housing via a hinge pin to be operated by a driver;
a stroke detector fixed to the pedal housing and connected to the pedal arm to generate a signal related to a pedal function when the pedal arm rotates in response to the driver's operation;
a link block provided to be forwardly spaced from the hinge pin and fixed to the pedal housing at a lower side of the pedal arm;
a rotation link provided to be rotatably coupled to the link block and to be in contact with the pedal arm; and
a spring module including first and second end portions directly rotatably coupled to the hinge pin and the rotation link, respectively, to provide the pedal arm with returning force thereof.

2. The electronic pedal apparatus of claim 1, wherein the pedal arm includes:

an operation unit which is configured to be operated by the driver; and
an arm unit which has a first end portion connected to the operation unit and a second end portion coupled to the hinge pin and is connected to the stroke detector.

3. The electronic pedal apparatus of claim 2, wherein the pedal arm has an organ structure in which a lower end portion of the arm unit is rotatably coupled to a lower side of a rear end portion of the pedal housing via the hinge pin and the operation unit on an upper side thereof rotates forwards and backwards around the hinge pin on a lower side thereof.

4. The electronic pedal apparatus of claim 2, wherein the rotation link includes:
a pair of link units rotatably coupled to opposite side surfaces of the link block; and
a link pin which connects the link units and comes into contact with the arm unit to support the pedal arm and to which the spring module is rotatably coupled.

5. The electronic pedal apparatus of claim 1, wherein the apparatus is used as an accelerator pedal apparatus or a brake pedal apparatus.

6. An electronic pedal apparatus comprising:
a pedal housing;
a pedal arm rotatably coupled to the pedal housing via a hinge pin to be operated by a driver;
a stroke detector fixed to the pedal housing and connected to the pedal arm to generate a signal related to a pedal function when the pedal arm rotates in response to the driver's operation;
a link block provided to be forwardly spaced from the hinge pin and fixed to the pedal housing at a lower side of the pedal arm;
a rotation link provided to be rotatably coupled to the link block and to be in contact with the pedal arm; and
a spring module including first and second end portions rotatably coupled to the hinge pin and the rotation link, respectively, to provide the pedal arm with returning force thereof;
a pedal arm stopper fixed to the pedal housing at a position in front of the hinge pin and configured to restrain a full stroke position of the pedal arm by being in contact with the pedal arm during the rotation of the pedal arm.

7. The electronic pedal apparatus of claim 6, wherein an upper surface of the pedal arm stopper is positioned above a center line connecting a center of the hinge pin and a rotation center of the rotation link in a straight line.

8. The electronic pedal apparatus of claim 7,
wherein two arm units of the pedal arm are arranged in parallel to be spaced from each other on a left side and a right side thereof; and
wherein the spring module is positioned between the two arm units.

9. An electronic pedal apparatus comprising:
a pedal housing;
a pedal arm rotatably coupled to the pedal housing via a hinge pin to be operated by a driver;
a stroke detector fixed to the pedal housing and connected to the pedal arm to generate a signal related to a pedal function when the pedal arm rotates in response to the driver's operation;
a link block provided to be forwardly spaced from the hinge pin, to be positioned under the pedal arm, and to be configured to slide with respect to the pedal housing;
a rotation link provided to be rotatably coupled to the link block and to be in contact with the pedal arm;

a spring module including first and second end portions rotatably coupled to the hinge pin and the rotation link, respectively, to provide the pedal arm with returning force thereof; and a foldable actuator fixed to the pedal housing and coming into contact with the link block and the rotation link during operation to operate for a pop-up state or a hidden state of the pedal arm.

10. The electronic pedal apparatus of claim 9, further including:

a return spring including first and second end portions supported by the pedal housing and the link block to provide returning force to the slid link block.

11. The electronic pedal apparatus of claim 9, further including:

a printed circuit board (PCB) fixed to the pedal housing and including a function of controlling operation of the foldable actuator.

12. The electronic pedal apparatus of claim 11, wherein the foldable actuator includes:

a motor which is fixed to the pedal housing at a side of the link block and is operated by control of the PCB;

a guide block which linearly moves along a lead screw rotating during operation of the motor to be in contact with or to be released from the link block, and when being in contact with the link block, restrains the movement of the link block; and a triangular guide which is connected to the guide block to move together with the guide block and is inserted under the rotation link to apply force for lifting the rotation link upwards when the guide block moves to come into contact with a front surface of the link block.

13. The electronic pedal apparatus of claim 12, wherein the triangular guide is positioned below the rotation link when the guide block is in contact with the front surface of the link block to restrain the movement of the link block, and a full stroke position of the pedal arm is restricted as the rotation link is in contact with the triangular guide when the pedal arm is rotated around the hinge pin in accordance with operation of the driver.

14. The electronic pedal apparatus of claim 12, wherein when the pedal arm is rotated around the hinge pin in accordance with operation of the driver in a state in which the guide block restrains the movement of the link block, the stroke detector is configured to generate a signal related to the pedal function.

15. The electronic pedal apparatus of claim 12, wherein when the guide block releases the link block due to the movement of the guide block by operation of the motor in a state in which the guide block is in contact with the link block to restrain the movement of the link block, the link block moves in a direction opposite to the hinge pin due to an elastic force of the return spring, the rotation link rotates toward a bottom portion of the pedal housing due to the elastic force of the spring module when the link block moves, the pedal arm rotates around the hinge pin in a direction in which the pedal arm is inserted into the pedal housing due to its own weight when the rotation link rotates, and thus the pedal arm is in the hidden state in which exposure thereof to the driver is blocked.

16. The electronic pedal apparatus of claim 15, wherein the link block is moved in a direction toward the hinge pin when the guide block comes into contact with the link block due to the movement of the guide block by operation of the motor in a state in which the pedal arm is hidden, the triangular guide is inserted under the rotation link and lifts the rotation link upwards when the guide block moves in a direction in which the guide block comes into contact with the link block, the pedal arm rotates around the hinge pin in a direction protruding from the pedal housing in a state of being supported by the rotation link when the rotation link rotates upwards due to the triangular guide, and thus the pedal arm is in the pop-up state in which operation by the driver is possible.

17. The electronic pedal apparatus of claim 9, wherein the pedal arm includes:

an operation unit which is configured to be operated by the driver; and an arm unit which has a first end portion connected to the operation unit and a second end portion coupled to the hinge pin and is connected to the stroke detector.

18. The electronic pedal apparatus of claim 17, wherein the rotation link includes:

a pair of link units rotatably coupled to opposite side surfaces of the link block; and a link pin which connects the link units and comes into contact with the arm unit to support the pedal arm and to which the spring module is rotatably coupled.

19. The electronic pedal apparatus of claim 9, wherein a guide groove and a guide protrusion are formed at the link block and the pedal housing, respectively, and wherein sliding movement of the link block is guided by the guide groove and the guide protrusion.

20. The electronic pedal apparatus of claim 19, wherein a stopper protrusion for restricting the movement of the link block in a predetermined direction is formed at a front end portion of the guide protrusion in a direction orthogonal to the guide protrusion.

* * * * *